UNITED STATES PATENT OFFICE.

JOHN McCONNELL, OF CANTON, OHIO, ASSIGNOR TO THE UNITED STEEL COMPANY, OF CANTON, OHIO, A CORPORATION OF OHIO.

PROCESS OF MAKING STEEL.

1,039,428.  Specification of Letters Patent.  Patented Sept. 24, 1912.

No Drawing.  Application filed May 9, 1912. Serial No. 696,086.

*To all whom it may concern:*

Be it known that I, JOHN McCONNELL, a citizen of the United States, residing at Canton, in the county of Stark and State of Ohio, have invented certain new and useful Improvements in the Process of Making Steel, of which the following is a specification.

The invention relates to the basic open-hearth process of making steel, and the object of the improvement is to prevent excessive oxidation of the charge, and to deoxidize and decarbonize the molten metal toward the end of the heat, so that the metal will be substantially free of oxygen and carbon at the end of the carbon reducing process, before the additions are made to produce the desired kind of steel.

When the furnace is charged with the limestone and the pig iron below and the scrap on top, the exposure of the scrap to the oxidizing influence of the flame gives an excessive oxidation of the iron; which difficulty is overcome by charging the pig iron on top of the scrap and the limestone. And when iron ore is used to reduce carbon down to the desired minimum for tapping, the slag will be very high in iron which causes most of the defects in steel; and especially causes the steel, after solidifying in molds, to show pearlite, that is the union of cementite with oxid of iron in combination with other elements, or to show a crystal fracture, which is often termed red shortness or seamy steel. These difficulties are overcome by introducing pure steel billets containing less than .05% of carbon, and from 2 to 5% of silicon, in place of iron ore, during the closing period of the carbon reducing portion of the process; which substituted reducing element not only prevents the molten metal from taking up oxygen, and absorbs some of the occluded oxygen and other gases, but furthermore permits the contained oxygen, carbon and other gases, to pass off into or through the slag.

In carrying out the improved process, a basic open-hearth furnace is charged with some 10% of scrap on the bottom of the hearth, on which is placed some 6% of limestone, 3% of burnt lime, and .05% of manganese, to prevent oxidation of the charge; and finally some 40% of scrap with 50% of pig iron on top of the scrap for further preventing oxidation of the charge, the percentages mentioned being proportioned to the metallic contents of the charge, neglecting the relatively small quantity of manganese. The charge is then melted and the carbon is worked down by the addition of iron ore from time to time in the usual manner, until the carbon is reduced to within about fifty points, or .5%, of the minimum required for tapping, or for the introduction of additions to make the desired kind of steel, as shall be determined by proper tests in the usual manner. Under the improved process, the remaining carbon required to be eliminated is expelled from the bath by the introduction therein of pure steel slabs or billets, containing less than .05% of carbon, and from 2 to 5% of silicon; the introduction of which billets not only reduces the carbon, but at the same time eliminates the oxygen and other gases in the bath, and especially disposes of those gases which have been formed by the previous introduction of the iron ore.

The melting of the steel billets permits the silicon therein to unite with the free oxygen or oxids in the bath, thus forming silica, which passes into or is absorbed by the slag; and the accompanying boiling of the bath, caused by the introduction of the cold billets, liberates the carbon in the form of carbon monoxid or carbon dioxid. The introduction of the steel billets is continued from time to time, as shall be determined by suitable tests, until a sufficient amount of oxygen and carbon have been eliminated for making the particular kind of steel desired.

The use of pure steel billets with the silicon therein as a deoxidizing and decarbonizing agent, permits the continuation of the heat, after the bath of metal has been reduced and purified to the proper condition for tapping; and permits the molten metal to be held or retained in the furnace during the time the proper additions, if any are necessary, have been introduced, and the necessary tests have been made, for producing the particular character of steel which may be desired: as, for instance, by reducing the carbon content to about one to forty points, that is about .01 to .4%, and then adding the necessary alloys in the furnace for making chrome vanadium steel; or by reducing the carbon content to about one point, that is about .01%, and then tapping without any addition in the furnace for making "enduro" metal.

It will be understood that the use of the pure steel billets with the silicon content for the final reduction of the carbon, leaves the slag much lower in iron than would result from the continued use of iron ore for the same purpose; and that a very pure steel is produced which is substantially free from seams and crystal specks, oxygen and blisters, and other defects which cause so much trouble in the finished product; and it will also be understood that this result can be further facilitated by keeping the slag very high in lime, as by the introduction of additional burnt lime into the bath, from time to time, as may be necessary.

The improvement in the process of making basic open-hearth steel, which consists in charging the pig iron on top of the scrap and the limestone, to prevent an excessive oxidation of the charge, which is described but not claimed herein, is made the subject-matter of a divisional application for Letters Patent filed June 25, 1912, Serial No. 705,808.

I claim:

The improvement in the process of making basic open-hearth steel, which consists in introducing into the bath during the closing period of the carbon reducing portion of the process, pure steel billets, having less than .05% of carbon and from 2 to 5% of silicon therein, for deoxidizing and decarbonizing the molten iron.

JOHN McCONNELL.

Witnesses:
ALFRED G. HOCKWALT,
WM. F. FROMM.